United States Patent
Izumi et al.

(10) Patent No.: US 8,953,681 B2
(45) Date of Patent: Feb. 10, 2015

(54) VIDEO TRANSFER SYSTEM

(75) Inventors: Kazutaka Izumi, Kanagawa (JP); Eiko Sone, Kanagawa (JP); Yu Ito, Kanagawa (JP); Masashi Takada, Kanagawa (JP)

(73) Assignee: NTT Electronics Corporation (JP)

( * ) Notice: Subject to any disclaimer, the term of this patent is extended or adjusted under 35 U.S.C. 154(b) by 275 days.

(21) Appl. No.: 13/703,108

(22) PCT Filed: May 20, 2011

(86) PCT No.: PCT/JP2011/061623
§ 371 (c)(1),
(2), (4) Date: Dec. 10, 2012

(87) PCT Pub. No.: WO2011/155304
PCT Pub. Date: Dec. 15, 2011

(65) Prior Publication Data
US 2013/0089147 A1  Apr. 11, 2013

(30) Foreign Application Priority Data
Jun. 10, 2010  (JP) .................... 2010-133046

(51) Int. Cl.
*H04N 7/32* (2006.01)
*H04N 19/50* (2014.01)
*H04N 21/43* (2011.01)

(52) U.S. Cl.
CPC ............. *H04N 7/32* (2013.01); *H04N 21/4307* (2013.01)

USPC ......................................... 375/240.12

(58) Field of Classification Search
CPC ........................................ H04N 13/00
USPC ......................................... 375/240.01
See application file for complete search history.

(56) References Cited

U.S. PATENT DOCUMENTS 6,167,077 A * 12/2000 Ducaroir et al. .............. 375/219
2003/0108341 A1 * 6/2003 Oshima et al. ................ 386/125

FOREIGN PATENT DOCUMENTS

| JP | 7-240940 A | 9/1995 |
| JP | 9-149262 A | 6/1997 |
| JP | 11-191895 A | 7/1999 |
| JP | 2000-092519 | 3/2000 |

OTHER PUBLICATIONS

International Search Report, PCT Application No. PCT/JP2011/061623, mailed Jun. 14, 2011.

* cited by examiner

*Primary Examiner* — Jay Patel
*Assistant Examiner* — Yulin Sun
(74) *Attorney, Agent, or Firm* — Kilpatrick Townsend & Stockton LLP

(57) ABSTRACT

A synchronization signal generator of a decoder adds a predetermined value to a time value, and outputs a synchronization signal when the added time value coincides with a reproducing time value in a frame.

2 Claims, 4 Drawing Sheets

FIG. 1
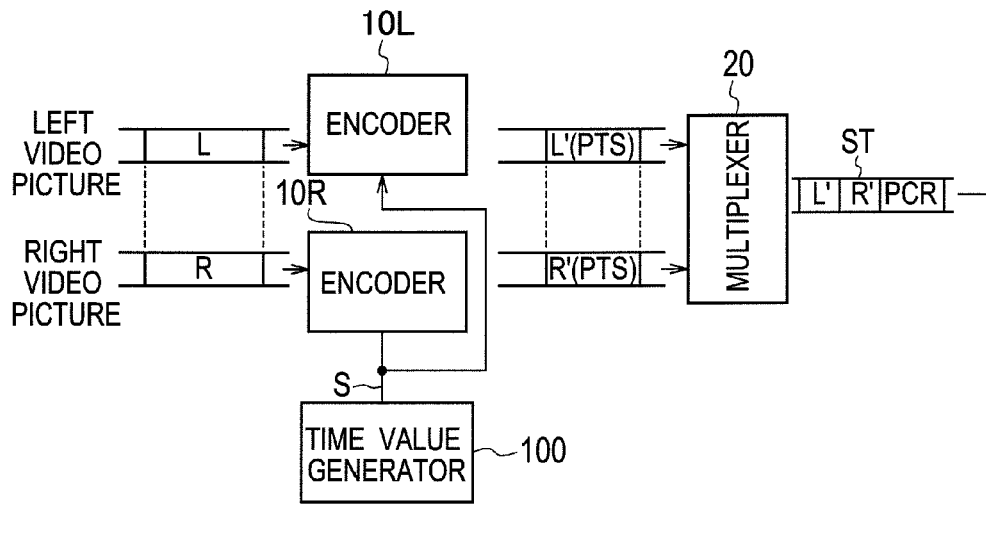
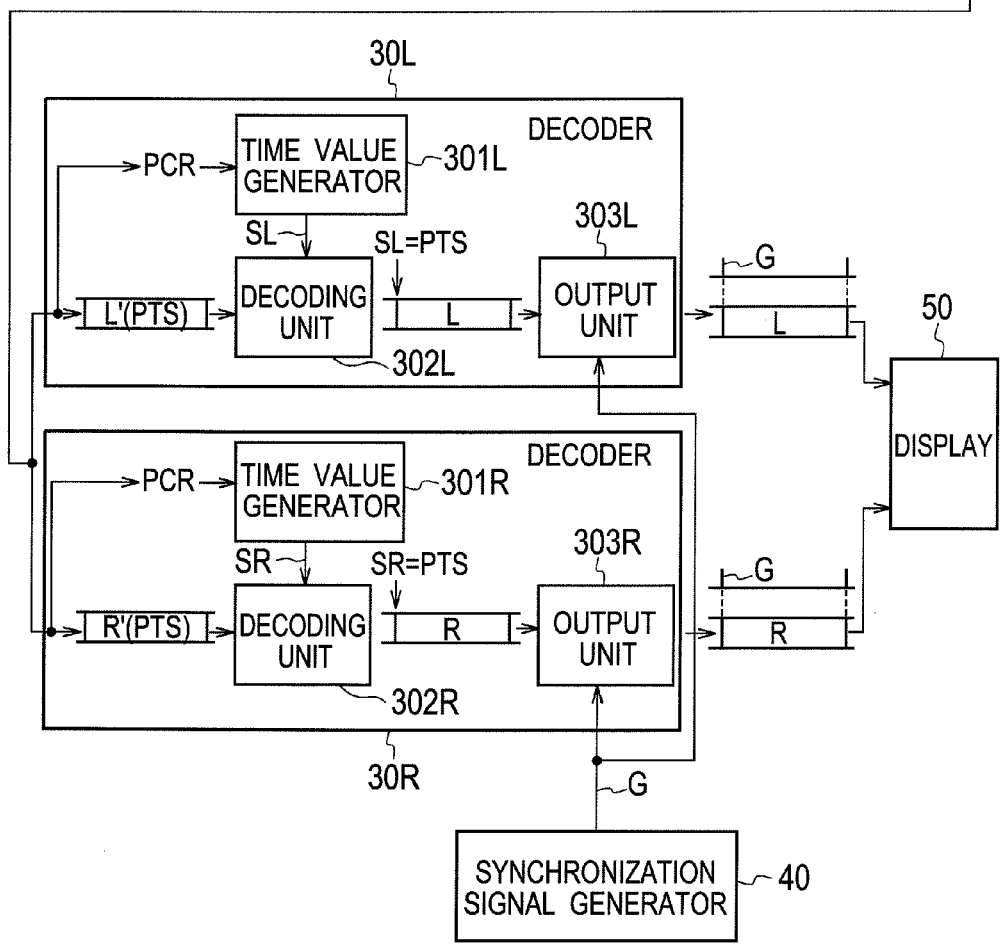

FIG. 3
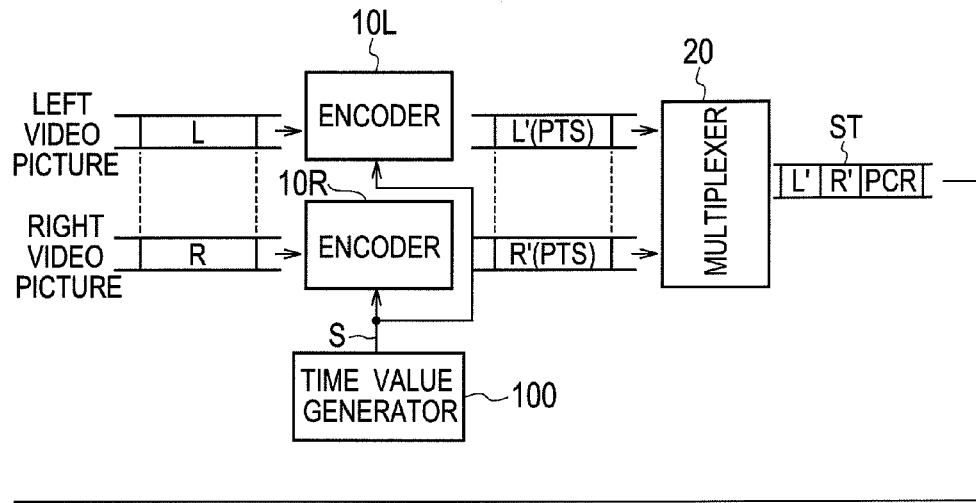
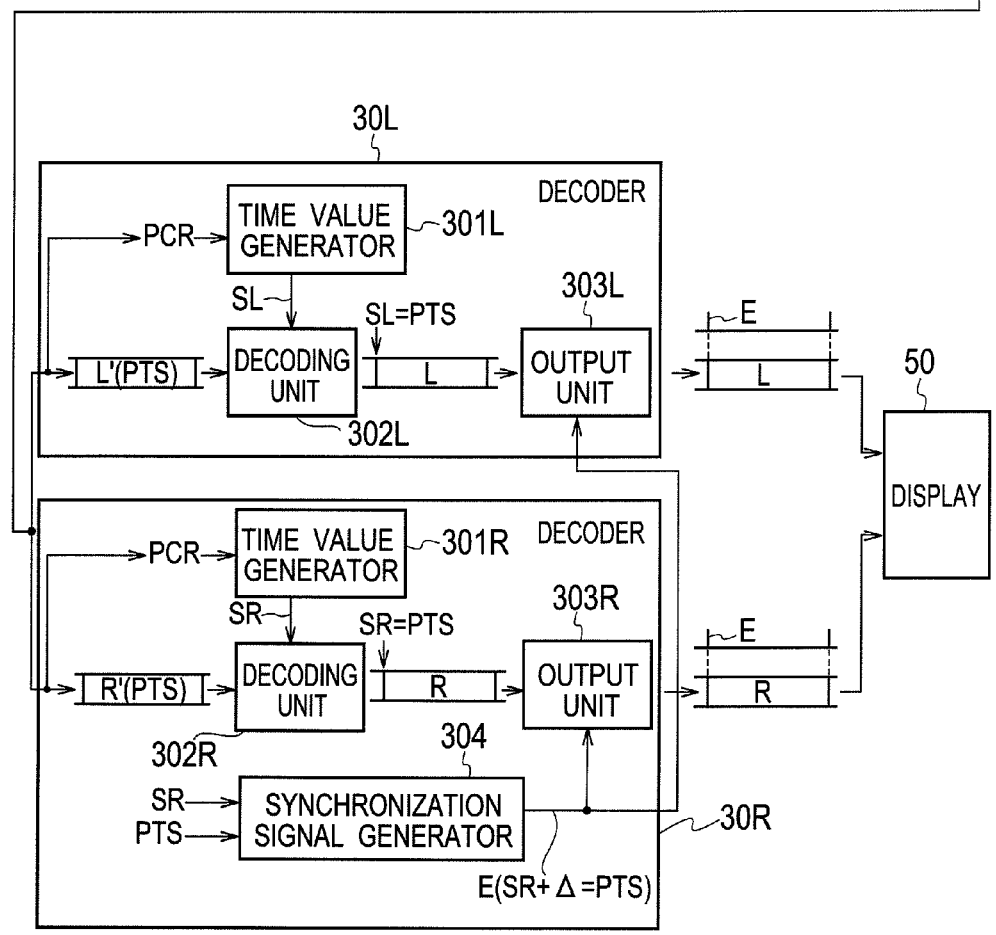

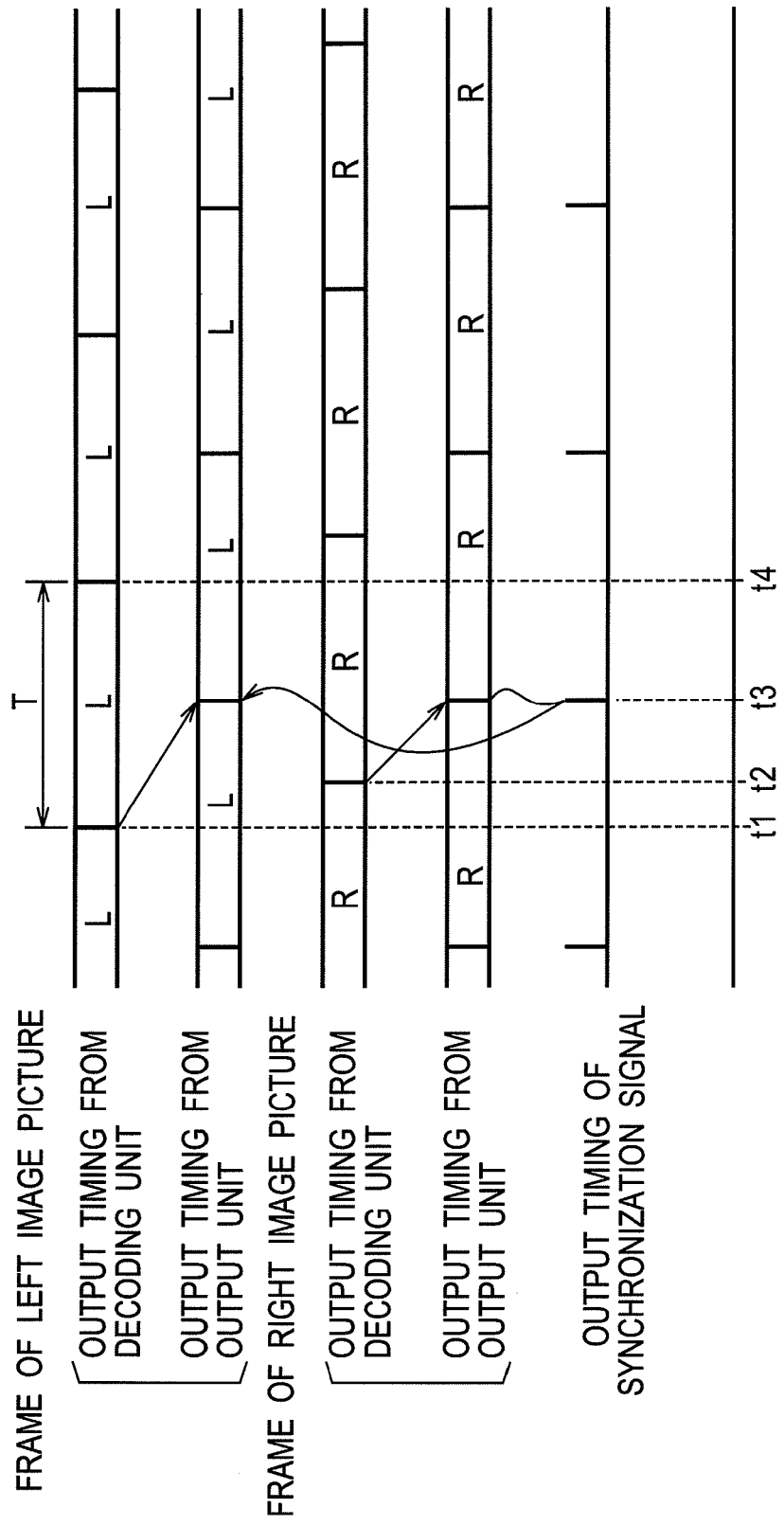

VIDEO TRANSFER SYSTEM

This application is a national stage application of PCT/JP2011/061623 which claims priority to JP 2010-133046, both of which are incorporated herein by reference.

TECHNICAL FIELD

The present invention relates to a video transfer system capable of outputting frames in the same timing to be output from a plurality of decoders in the same timing.

BACKGROUND ART

A video transfer system for sterically-displaying a video picture has been disclosed (see PLT 1).

FIG. 1 is a diagram that illustrates a configuration of the conventional video transfer system.

A time value generator 100 sequentially outputs an updated time value S which is measured by an internal timer (not shown). Namely, an updated time value S increases step-by-step, and returns to "0" when reaching a maximum value. Then, it again increases step-by-step and is output.

An encoder 10L sequentially encodes each frame L which constructs a left video picture. The encoder 10L assigns to an encoded frame L' a reproducing time value PTS which is equal to a time value S at the time of encoding, and then outputs it.

An encoder 10R sequentially encodes each frame R which constructs a right video picture. The encoder 10R assigns to an encoded frame R' a reproducing time value PTS which is equal to a time value S at the time of encoding, and then outputs it.

A left video picture and a right video picture are synchronized with each other. Frames L and R to be reproduced in the same timing are input into the encoders 10L and 10R in the same timing. Thereby, the same reproducing time value PTS is assigned to frames L' and R', to be reproduced in the same timing, generated by encoding these frames L and R.

A multiplexing device 20 multiplexes an encoded left video picture and an encoded right video picture. Frames L' and R' to be reproduced in the same timing are multiplexed, and included in a multiplexed frame ST and then output. The multiplexed stream ST also includes packets each indicative of a reference time value PCR for time output in an encoding side and a decoding side at a predetermined interval. Namely, the reference time value PCR is used to set time values SL and SR to a time value S in the encoding side. The multiplexed stream ST is transmitted via a communication channel (not shown) and sent to decoding units 302L and 302R. Each of the decoding units 302L and 302R extracts from a multiplexed stream ST, a frame and the like necessary for processing which it carries out.

A time value generator 301L of a decoder 30L sequentially outputs an updated time value SL which is measured by an internal timer (not shown). Namely, an updated time value SL increases step-by-step, and returns to "0" when reaching a maximum value. Then, it again increases step-by-step and is output.

When a reference time value PCR is extracted, the time value generator 301L changes a generated time value SL such that it becomes equal to the reference time value PCR. It is noted that it takes time for the time value SL to become equal to the reference time value PCR because the time value SL does not immediately become equal to the reference time value PCR.

The decoding unit 302L of the decoder 30L sequentially decodes each frame L' which constructs a left video picture. When a time value SL coincides with a reproducing time value PTS in the frame L', the decoding unit 302L outputs a decoded frame L.

A synchronization signal generator 40 periodically outputs a synchronization signal G.

When a synchronization signal G is output, an output unit 303L of the decoder 30L outputs a frame L to a display 50. The display 50 displays it.

A time value generator 301R of a decoder 30R periodically outputs a time value SR which is generated by an internal timer (not shown). Each time value SR increases step-by-step, and returns to "0" when reaching a maximum value. Then, it again increases step-by-step and is output.

When a reference time value PCR is extracted, the time value generator 301R changes a generated time value SR such that it becomes equal to the reference time value PCR. It is noted that it takes time for the time value SR to become equal to the reference time value PCR because the time value SR does not immediately become equal to the reference time value PCR.

The decoding unit 302R of the decoder 30R sequentially decodes each frame R' which constructs a right video picture. When a time value SR coincides with a reproducing time value PTS in the frame R', the decoding unit 302R outputs a decoded frame R.

When a synchronization signal G is output, an output unit 303R of the decoder 30R outputs a frame R to the display 50. The display 50 displays it.

For example, he/she can obtain a stereoscopic video picture when watching a display video picture of frame L and a display video picture of frame R through special glasses.

CITATION LIST

Patent Literature

[PTL 1]
Japanese Patent Application Laid-Open Publication No. 2000-092519

SUMMARY OF INVENTION

Technical Problem

In the above-described video transfer system, there is a possibility that a gap between the time values SL and SR occurs due to variation in characteristics of components constituting the decoders 30L and 30R and the like. There is also a possibility that the time values SL and SR change due to disturbance in temperature or the like, not to coincide with each other.

Since the time values SL and SR are caused to become equal to the reference time value PCR, they eventually coincide with each other. However, it is necessary to change the time values SL and SR multiple times until they become equal to the reference time value PCR. Until then, there is a possibility that a gap between the time values SL and SR occurs.

In the above-described video transfer system, due to this gap, there is a possibility that the frames L and R to be displayed in the same timing are displayed in the different timing.

FIG. 2 is a timing chart that illustrates output timings of frames of a right image picture and a left image picture.

For example, the decoding unit 302L of the decoder 30L starts to output a frame L at a time t1. This allows the frame L to be output to the display 50.

The decoding unit 302R of the decoder 30R starts to output a frame R to be displayed in the same timing as the frame L, at a time t2. This allows the frame R to be output to the display 50.

For example, the time t2 is behind the time t1. This delaying occurs due to the time values SL and SR which are not synchronized, that is are not equal to each other in the same timing.

For example, the synchronization signal generator 40 outputs the synchronization signal G at a time t3. For example, the time t3 is a time between the times t1 and t2.

The output unit 303L of the decoder 30L outputs the frame L which has been output from the decoding unit 302L at the time t1, at the time t3.

On the other hand, the output unit 303R of the decoder 30R outputs the frame R which has been output from the decoding unit 302R at the time t2, at a time t3' when a subsequent synchronization signal G is output.

From the above, the frames L and R to be displayed in the same timing are displayed in the different timing.

The present invention is made in view of the above problem, and it is an object thereof to provide a video transfer system capable of assigning a reproducing time value to frames of video pictures in encoders, allowing outputs of encoded frames when time values coincide with the reproducing time value in the encoders, and outputting the frames from the encoders when a synchronization signal is output, wherein the video transfer system allows outputs of frames in the same timing which should be output from the encoders in the same timing.

Solution to Problem

In order to solve the above-described problem, a video transfer system of the present invention comprises: a time value generator that outputs a time value; a plurality of display object video picture encoders each of which encodes a frame of a display object video picture, and assigns to the frame a reproducing time value coinciding with a time value at the time of encoding; a reference video picture encoder that encodes a frame of a reference video picture, and assigns to the frame a reproducing time value coinciding with a time value at the time of encoding; a multiplexer that multiplexes the encoded frames of the display object video pictures and the reference video picture to generate a multiplexed stream; a plurality of display object video picture decoders each of which extracts the frame of the display object video picture from the multiplexed stream, and decodes the frame; and a synchronization signal generating device that extracts the reference video picture from the multiplexed stream, and generates a synchronization signal using the reference video picture, wherein each display object video picture decoder includes: a time value generator that outputs a time value; a decoding unit that decodes the extracted frame of the display object video picture, and outputs the decoded frame when the time value coincides with the reproducing time value in the extracted frame; and an output unit that outputs the decoded frame outside when the synchronization signal is output from the synchronization signal generating device, and the synchronization signal generating device includes: a time value generator that outputs a time value; and a synchronization signal generator that adds a predetermined value to the time value, and outputs a synchronization signal to the each display object video picture decoder when the added time value coincides with the reproducing time value in the extracted frame of the reference video picture.

Advantageous Effects of Invention

According to the video transfer system of the present invention, there is provided the synchronization signal generating device including the synchronization signal generator which adds the predetermined value to the time value output from the time value generator, and outputs the synchronization signal to each display object video picture decoder when the added time value coincides with the reproducing time value in the frame of the reference video picture. This allows the output of frames in the same timing, which should be output from plural display object video picture decoders in the same timing.

BRIEF DESCRIPTION OF DRAWINGS

FIG. 1
It is a diagram that illustrates a configuration of a conventional video transfer system.
FIG. 3
It is a diagram that illustrates a configuration of a video transfer system according to the present embodiment.
FIG. 4
It is a timing chart that illustrates output timings of frames of a right image picture and a left image picture in the system of FIG. 3.

DESCRIPTION OF EMBODIMENTS

Figure 2:
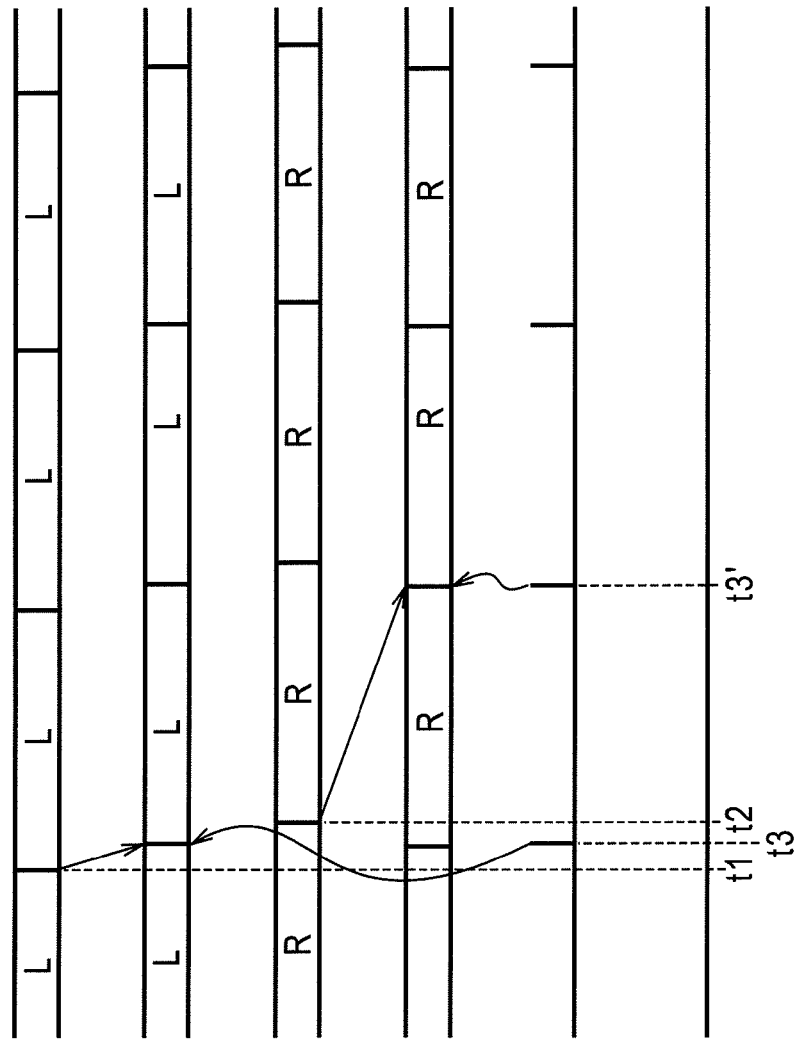
FIG. 2
It is a timing chart that illustrates output timings of frames of a right image picture and a left image picture in the system of FIG. 1.

An exemplary embodiment of the present invention will be described below with reference to drawings.

FIG. 3 is a diagram that illustrates a configuration of a video transfer system according to the present embodiment.

The video transfer system according to the present embodiment (hereinafter merely called a video transfer system) includes a time value generator 100 that outputs a time value S, encoders 10L and 10R that encode a left video picture for a left eye and a right video picture for a right eye used to sterically-display a video picture, a multiplexer 20 that multiplexes an encoded left video picture and an encoded right video picture and then outputs it as one multiplexed stream ST, decoders 30L and 30R that extract a left video picture and a right video picture from a multiplexed stream and then decode them, and a display 50 that display a decoded left video picture and a decoded right video picture.

Each of a left video picture and a right video picture is a display object and is also called a display object video picture. The right video picture is referenced for a synchronization output of encoded video pictures and doubles as a reference video picture.

Each of the encoders 10L and 10R encodes the display object video picture and is also called a display object video picture encoder. The encoder 10R encodes the reference video picture and doubles as a reference video picture encoder.

Each of the decoders 30L and 30R decodes the display object video picture and is also called a display object video picture decoder. The decoder 30R generates a synchronization signal using the reference video picture and doubles as a synchronization signal generating device.

The decoder 30L includes a time value generator 301L that outputs a time value SL, a decoding unit 302L that decodes a left video picture, and an output unit 303L that outputs a decoded left video picture to the display 50.

The decoder 30R includes a time value generator 301R that outputs a time value SR, a decoding unit 302R that decodes a right video picture, an output unit 303R that outputs a decoded right video picture to the display 50, and a synchronization signal generator 304 that outputs a synchronization signal E to the output units 303L and 303R of the decoders 30L and 30R.

(Operation of Video Transfer System)

The time value generator 100 sequentially outputs an updated time value S which is measured by an internal timer (not shown). Namely, an updated time value S increases step-by-step, and returns to "0" when reaching a maximum value. Then, it again increases step-by-step and is output.

The encoder 10L sequentially encodes each frame L which constructs a left video picture. The encoding is compression processing and each frame subject to the encoding is output as a stream. The same is applied to the following encoding.

The encoder 10L assigns to an encoded frame L' a reproducing time value (presentation time stamp) PTS which is equal to a time value S at the time of encoding, and then outputs it.

The encoder 10R sequentially encodes each frame R which constructs a right video picture. The encoder 10R assigns to an encoded frame R' a reproducing time value PTS which is equal to a time value S at the time of encoding, and then outputs it.

A left video picture and a right video picture are synchronized with each other. Frames L and R to be reproduced in the same timing are input into the encoders 10L and 10R in the same timing. Thereby, the same reproducing time value PTS is assigned to frames L' and R' generated by encoding these frames L and R, to be reproduced in the same timing.

The multiplexer 20 multiplexes an encoded left video picture and an encoded right video picture to generate one multiplexed stream ST. In the multiplexed stream ST, frames L' and R' to be reproduced in the same timing, and packets each indicative of a reference time value (called a program clock reference) PCR, which is equal to a time value S in the multiplexing, are included at a predetermined interval.

The reference time value PCR is later used in processing for causing time values SL and SR to become equal to the reference time value PCR.

The multiplexed stream ST is transmitted via a communication channel (not shown). The decoders 30L and 30R receive the multiplexed stream ST, and then extract a reference time value PCR from the multiplexed stream ST and respectively extract frames L' and R' from the multiplexed stream ST. A reproducing time value PTS has been assigned to the frames L' and R'.

A time value generator 301L of a decoder 30L sequentially outputs an updated time value SL which is measured by an internal timer (not shown). Namely, an updated time value SL increases step-by-step and is output, and returns to "0" when reaching a maximum value. Then, it again increases step-by-step and is output.

When a reference time value PCR is extracted, the time value generator 301L changes a generated time value SL such that it becomes equal to the reference time value PCR. It is noted that it takes time for the time value SL to become equal to the reference time value PCR and become stabilized because the time value SL does not immediately become equal to the reference time value PCR.

The decoding unit 302L of the decoder 30L sequentially decodes each frame L' which constructs a left video picture.

The decoding is extension processing corresponding to the compressing processing. The same is applied to the following decoding.

When a time value SL coincides with a reproducing time value PTS in the frame L', the decoding unit 302L outputs a decoded frame L.

A time value generator 301R of a decoder 30R sequentially outputs an updated time value SR which is measured by an internal timer (not shown). Namely, an updated time value SR increases step-by-step and is output, and returns to "0" when reaching a maximum value. Then, it again increases step-by-step and is output.

When a reference time value PCR is extracted, the time value generator 301R changes a generated time value SR such that it becomes equal to the reference time value PCR. It is noted that it takes time for the time value SR to become equal to the reference time value PCR and become stabilized because the time value SR does not immediately become equal to the reference time value PCR.

The decoding unit 302R of the decoder 30R sequentially decodes each frame R' which constructs a right video picture.

When a time value SR coincides with a reproducing time value PTS in the frame R', the decoding unit 302R outputs a decoded frame R.

A synchronization signal generator 304 of the decoder 30R adds a predetermined value A to a time value SR, and outputs a synchronization signal E when the added time value coincides with a reproducing time value PTS in a frame R'. The value Δ is a value calculated based on a result of measured characteristic of the video transfer system. Details will be described later.

When a synchronization signal E is output from the synchronization signal generator 304, an output unit 303L of the decoder 30L outputs a frame L to the display 50. The display 50 displays it.

When a synchronization signal E is output from the synchronization signal generator 304, an output unit 303R of the decoder 30R outputs a frame R to the display 50. The display 50 displays it.

For example, he/she can obtain a stereoscopic video picture when watching a display video picture of frame L and a display video picture of frame R through special glasses.

In the video transfer system, the frames L and R to be displayed in the same timing is displayed in the same timing.

FIG. 4 is a timing chart that illustrates output timings of frames of a right image picture and a left image picture.

For example, the decoding unit 302L of the decoder 30L starts to output a frame L at a time t1. This allows the frame L to be output to the display 50.

The decoding unit 302R of the decoder 30R starts to output a frame R to be displayed in the same timing as the frame L, at a time t2. This allows the frame R to be output to the display 50.

For example, the time t2 is behind the time t1. This delaying occurs due to the time values SL and SR which are not synchronized, that is are not equal to each other in the same timing.

In the video transfer system, there is a possibility that a gap between the time values SL and SR occurs due to variation in characteristics of components constituting the decoders 30L and 30R and the like. There is also a possibility that the time values SL and SR change due to disturbance in temperature or the like, not to coincide with each other.

Since the time values SL and SR are caused to become equal to the reference time value PCR, they eventually coincide with each other. However, it takes time for the time values SL and SR to become equal to the reference time value PCR. Until then, there is a possibility that a gap between the time values SL and SR occurs.

For example, the synchronization signal generator 304 of the decoder 30R outputs the synchronization signal E at a time t3.

The time t3 is a time between the time t2 and a time t4 for starting to output a next frame L.

In the video transfer system, a period from the time t1 to the time t2 is previously measured, and the value Δ to be used in the encoder 30R is previously calculated such that the time t3 is not included in the period. The synchronization signal generator 304 of the encoder 30R adds the value Δ to the time value SR, and outputs the synchronization signal E when the added time value coincides with the reproducing time value PTS in the frame R'.

We assume that a period (also called frame period) from the time t1 to the time t4 is T (second). T/2 seconds is set to the value Δ and the value A is used because the period from the time t1 to time t2 is normally shorter than T/2. Thereby, the synchronization signal E is output after the elapse of T/2 seconds from the time t1 or the like, that is while avoiding the period from the time t1 to the time t2.

The output unit 303L of the decoder 30L outputs at the time t3 the frame L which has started to be output from the decoding unit 302L at the time t1.

The output unit 303R of the decoder 30R outputs at the time t3 the frame R which has started to be output from the decoding unit 302R at the time t2.

Namely, the frames L and R to be displayed in the same timing are output in the same timing.

Therefore, according to the video transfer system, there is provided the synchronization signal generating device (30R) including the synchronization signal generator 304 which adds the predetermined value Δ to the time value SR output from the time value generator 301R, and outputs the synchronization signal to each display object video picture decoder when the added time value coincides with the reproducing time value PTS in the frame of the reference video picture. This allows the output of frames in the same timing, which should be output from plural display object video picture decoders (30L and 30R) in the same timing.

It is noted that although the present embodiment describes the right video picture and the left video picture as an example, it is not limited them. The above-described configuration may be adapted in a video transfer system which displays two or more arbitrary display object video pictures. Thereby, frames to be output in the same timing may be output in the same timing.

For example, it may be adapted to a case where "4K×2K" video which is generated by each of the number of horizontal pixels and the number of vertical pixels is doubled hi-vision (that is, quadrupled in area), is synchronized in hi-vision four channels and transferred.

Also, the present embodiment describes that the display object video picture (right video picture) doubles as the reference video picture, the display object video picture encoder (10R) doubles as the reference video picture encoder, and the display object video picture decoder (30R) doubles as the synchronization signal generating device. However, the reference video picture, the reference video picture encoder and the synchronization signal generating device may be respectively independent of the display object video picture, the display object video picture encoder and the display object video picture decoder.

Further, although the present embodiment describes that one-half of the frame period is set to the value Δ, the value Δ may be arbitrarily obtained by way of experiment if the value Δ is larger than "0" and smaller than a value equivalent to the frame period.

REFERENCE SIGNS LIST

10L, 10R encoders
20 multiplexer
30L, 30R decoders
40 synchronization signal generator
50 display
100, 301R, 301L time value generators
302L, 302R decoding units
303L, 303R output units
304 synchronization signal generator
PCR reference time value
PTS reproducing time value
S, SL, SR time values
ST multiplexed stream

The invention claimed is:

1. A video transfer system comprising:
a time value generator that outputs a time value;
a plurality of display object video picture encoders each of which encodes a frame of a display object video picture, and assigns to the frame a reproducing time value coinciding with a time value at the time of encoding;
a reference video picture encoder that encodes a frame of a reference video picture, and assigns to the frame a reproducing time value coinciding with a time value at the time of encoding;
a multiplexer that multiplexes the encoded frames of the display object video pictures and the reference video picture to generate a multiplexed stream;
a plurality of display object video picture decoders each of which extracts the frame of the display object video picture from the multiplexed stream, and decodes the frame; and
a synchronization signal generating device that extracts the reference video picture from the multiplexed stream, and generates a synchronization signal using the reference video picture,
wherein
each display object video picture decoder includes:
a time value generator that outputs a time value;
a decoding unit that decodes the extracted frame of the display object video picture, and outputs the decoded frame when the time value coincides with the reproducing time value in the extracted frame; and
an output unit that outputs the decoded frame outside when the synchronization signal is output from the synchronization signal generating device, and
the synchronization signal generating device includes:
a time value generator that outputs a time value; and
a synchronization signal generator that adds a predetermined value to the time value, and outputs a synchronization signal to the each display object video picture decoder when the added time value coincides with the reproducing time value in the extracted frame of the reference video picture.

2. The video transfer system according to claim 1, wherein
one of the display object video pictures doubles as the reference video picture,
one of the display object video picture encoders doubles as the reference video picture encoder, and one of the display object video picture decoders doubles as the synchronization signal generating device.

* * * * *